June 3, 1947. H. B. LINDSAY 2,421,457
DIE PLATE FOR FLANGING METALLIC SHEETS OF VARIABLE SIZE
Filed March 5, 1945 3 Sheets-Sheet 1
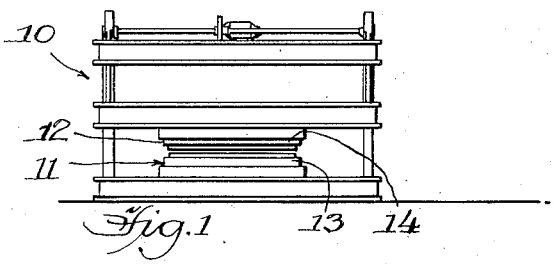
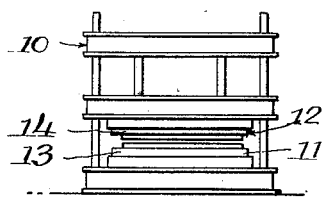
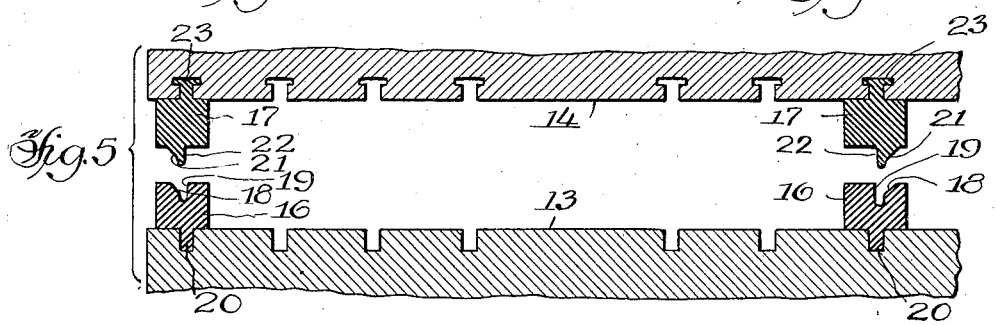
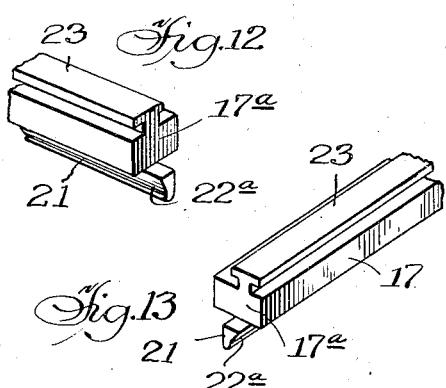
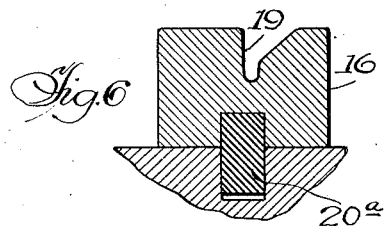
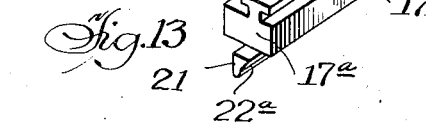
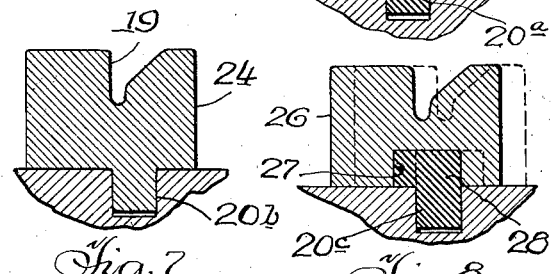
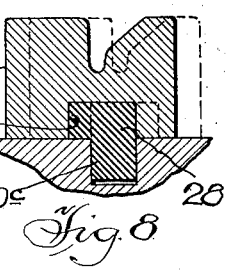
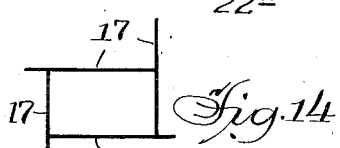
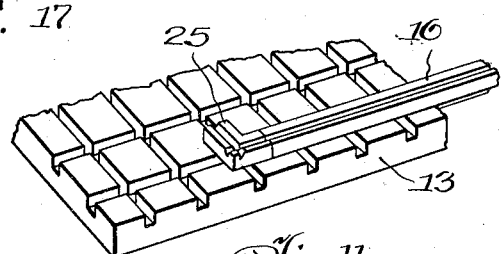
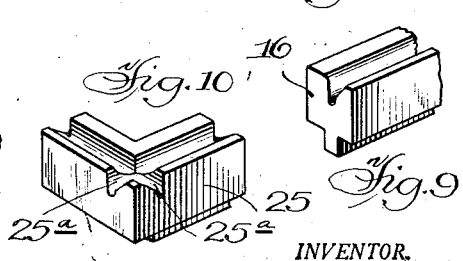
INVENTOR.
Harvey B. Lindsay
BY Clarence F. Poole
Atty.

June 3, 1947.  H. B. LINDSAY  2,421,457
DIE PLATE FOR FLANGING METALLIC SHEETS OF VARIABLE SIZE
Filed March 5, 1945  3 Sheets-Sheet 2
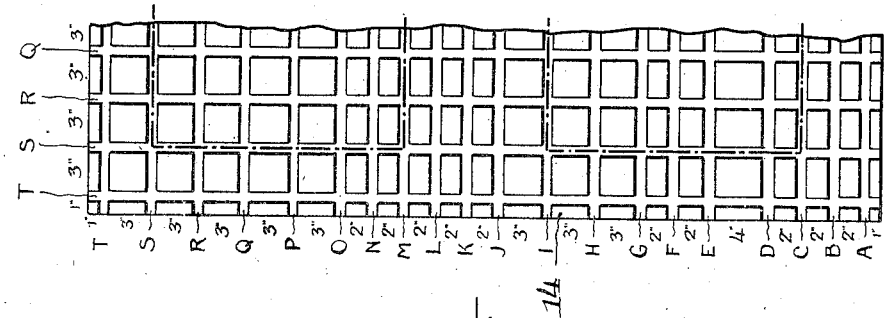
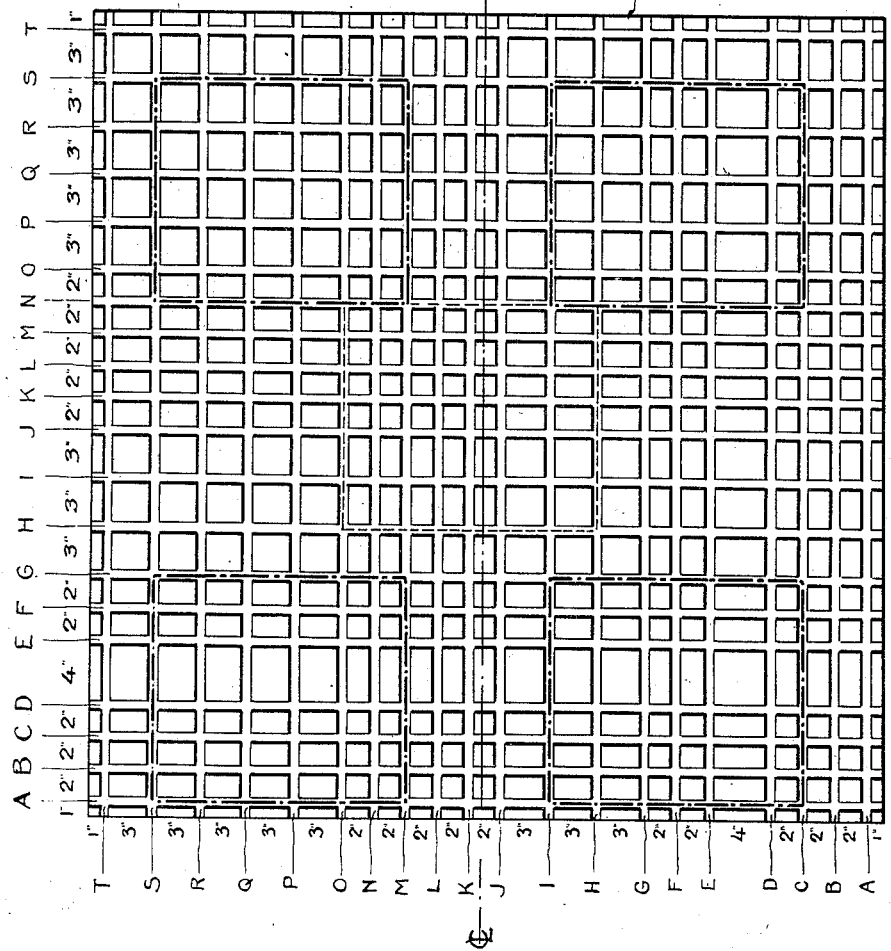
INVENTOR.
Harvey B. Lindsay
BY
Clarence F. Poole
Atty.

June 3, 1947.  H. B. LINDSAY  2,421,457
DIE PLATE FOR FLANGING METALLIC SHEETS OF VARIABLE SIZE
Filed March 5, 1945  3 Sheets-Sheet 3

Fig. 15  DIE SLOT SCHEDULE for BOTH LENGTH and WIDTH

NOTE: PANEL DIMENSIONS SHOWN HAVE 1" ADDED TO INCLUDE ½" FRAME WIDTH AT EACH END.

INVENTOR.
Harvey B. Lindsay
BY Clarence F. Poole
Atty.

Patented June 3, 1947

2,421,457

UNITED STATES PATENT OFFICE 2,421,457

DIE PLATE FOR FLANGING METALLIC SHEETS OF VARIABLE SIZE

Harvey B. Lindsay, Evanston, Ill., assignor, by mesne assignments, to The Lindsay Corporation, Chicago, Ill., a corporation of Illinois Application March 5, 1945, Serial No. 581,132

18 Claims. (Cl. 153—21)

This invention relates to improvements in flange-forming die apparatus of the kind used for mass production of flanged edges of rectangular metal sheets intended for building panels or similar purposes.

Die apparatus of the kind above described must be capable of withstanding enormous pressures. For instance, for even 24 gauge mild steel sheet, a pressure of approximately four tons per foot of flange is required in a standard flange-drawing operation. There is also an insistent demand for a wide variety of panel dimensions, including fractional inch variations, which calls for simple and efficient means for adjusting the die elements quickly and easily for the production of sheets in an infinite variety of sizes and shapes. One form of flanging apparatus is disclosed in my prior Patent No. 2,276,052, but in practice this and other apparatus heretofore used for this purpose are lacking in flexibility of adjustment, are relatively complicated in construction, require considerable skill and manipulation of the die parts in the limited adjustment available and their range of adjustment cannot be substantially increased without weakening the die structure. In addition, they are not readily adapted for the mass production of a plurality of sheets in a single pressing operation.

Among the objects of the present invention is to provide a simpler form of die apparatus of the strength required for the purposes described, wherein the die parts can be more easily manipulated and adjusted for the mass production of sheets of different shapes and sizes.

A further object is to provide an improved form and arrangement of die assemblies, wherein two die plates are provided with similarly arranged sets of intersecting slots in predetermined spaced relation to permit interchangeable mounting of die bars thereon so as to render the apparatus capable of producing sheets in any one of many thousands of shapes and sizes.

A further object of the invention is to provide an improved die bar structure capable of providing small or fractional inch adjustment of panel sizes, while maintaining a relatively wide spacing of the die bar slots desirable for strength of the die plates.

A further and important object is to provide an improved form and arrangement of die plates with intersecting slots as aforesaid, in which a plurality of sheets of like sizes can be produced in a single flanging operation.

A still further object is to provide an arrangement and spacing of the intersecting slots so that a plurality of die forms of like sizes and shapes can be disposed substantially symmetrically of the center lines of the die plates, so as to meet the important mechanical requirement of centering the load during any sheet flanging operation.

The invention may best be understood by reference to the accompanying drawings in which:

Figure 1 is a front view of a die forming apparatus with which my improved form of die assembly may be employed, Figure 2 is an end view of the apparatus shown in Figure 1, Figure 3 is an enlarged face view of a die plate forming part of my improved form of die assembly, Figure 4 is a fragmentary face view of a second die plate designed to cooperate with the die plate shown in Figure 3, Figure 5 is an enlarged fragmentary detail section of the die plates shown in Figures 3 and 4, with a plurality of sets of die bars mounted thereon in cooperating relation, Figure 6 is a detail section of a modified form of die bar, Figure 7 is a detail section of another modified form of die bar, Figure 8 is a detail section of another modified form of die bar, Figure 9 is a perspective view of one end of a female die bar similar to that shown in Figure 5, Figure 10 is a perspective view of a corner piece adapted for use with the form of die bar shown in Figure 9, Figure 11 is a fragmentary perspective view of the die plate with a section of a female die bar and a corner piece mounted thereon, Figure 12 is a fragmentary perspective view showing one end of a male die bar, Figure 13 is a fragmentary perspective view showing the end of another male die bar, and illustrating one method of arranging two such die bars in abutting relation with each other, Figure 14 is a diagram illustrating further the method of arranging a plurality of die bars in abutting relation with each other to form a complete rectangular die form, Figure 15 shows a "die slot schedule" designed for indicating the preferred selection of die slots for producing die forms of different shapes and sizes.

Referring now to details of the embodiment of my invention illustrated in the drawings, 10 indicates generally a forming die apparatus in which my improved form of die assemblies may be employed. The apparatus shown in Figures 1 and 2 is of a well known form, such as shown in my prior Patent No. 2,276,052.

A die assembly 11 is suitably fixed on the bed plate of the apparatus, and a cooperating die assembly 12 is fixed on an upper frame arranged for movement toward and away from the lower die assembly by any well known mechanism, which need not be shown or described in detail as it forms no part of the present invention.

The lower die assembly 11 includes a plate 13 having a flat upper surface provided with a plurality of slots or grooves intersecting each other and extending longitudinally and transversely of the plate 13 as shown in Figure 3. These slots are adapted to receive a plurality of flanging die bars in interchangeable relation therein to produce rectangular die forms of different shapes and sizes, as will presently appear.

The upper die assembly 12 consists of a plate 14 as shown in Figure 4 provided with the same number and arrangement of intersecting slots as the lower plate 13, excepting that as shown, the slots on the upper plate 14 are preferably provided with undercut retaining grooves 14a, 14a, substantially T-shaped in cross section, to hold the die bars from dropping out by gravity, and also to facilitate their adjustment, as will presently appear. The two die plates 13 and 14 are disposed in mutually reversed relationship so that the die slots match each other in registering relation when the plates are disposed in their normal opposed relation in the die forming apparatus. This mutually reversed relationship of the slots may be noted by comparison of Figures 3 and 4, in which the latter figure shows a fragmentary bottom view of the upper plate 14, as though it were swung away from the lower plate 13 along adjacent edges, until both plates are brought into the same plane.

Since the arrangement of slots on the two die plates is identical, a description of that of plate 13 will suffice for both. As shown herein, said plate is 50 inches square, and is designed to handle a single panel in any length and width measured in multiples of one inch or fractions thereof, ranging from less than two inches square up to 48 inches square. Due to the novel spacing arrangement of the slots shown herein, the single plate 13 is also capable of handling in a single drawing operation, at least four panels ranging from less than 2 inches square up to 22 inches square. This exceptional flexibility of adjustment is accomplished with only twenty slots extending each way.

For convenience in description, each group of intersecting slots are indicated consecutively in Figure 3 by the letters of the alphabet. Slot A of the vertical group is disposed with its center line 1" from the left side of the plate 13, slot B's center line is spaced 2" from A's; C's center line is 2" from B's, and the remaining slots are spaced at certain varying distances of 2, 3, or 4 inches, as shown. Thus, the centers of all of the slots of each group are spaced from each other at distances which are exact multiples of one inch, the smallest distance being two inches, so as to provide sufficient strength between adjacent slots.

The horizontal slots A, B, C, etc., of the plate 13 are spaced apart the same variable distances, respectively, beginning at the bottom of said plate, as the corresponding vertical slots A, B, C, etc. The advantages of the specific arrangement and spacing of slots, whereby an infinite variety of sheet sizes can be formed in multiples of one inch or fractions thereof, will be presently explained more fully.

Figure 5 shows a typical arrangement of flanging die bars wherein a pair of female die bars 16, 16 are mounted on the lower die plate 13 and a pair of matching male die bars 17, 17 are mounted on the upper die plate 14. Obviously, however, the male die bars may be mounted on the lower plate, and the female dies on the upper plate, if desired.

Each female die bar 16 has a suitable forming groove 18 with a flanging shoulder 19 along its upper surface. Said die bar also has a key or tongue 20 along its bottom surface, adapted for interchangeable fitting engagement in any one of the intersecting slots on plate 13. The keys may be made integral with the die bars, as shown in Figure 5, or may be formed of a separate strip 20a suitably recessed in the bottom of the bar, as shown in Figure 6.

The male die bars 17, 17 have forming ribs 21, with flanging shoulders 22, complementary to the grooves and flanging shoulders on the female die bars. They also have keys 23, along their back surfaces, similar to the keys 20 of the female die bars, excepting that they are substantially T-shaped in cross-section so as to be retained in the correspondingly shaped slots in the upper plate.

The male and female die bars shown in Figures 5 and 6 have their flanging shoulders 19 and 22 disposed directly over and in substantially centered relation with their respective keys 20 and 23, excepting that the customary small amount of lateral clearance and draw is provided for said flanging shoulders. With this arrangement the resulting flange will be formed substantially in alignment with the center lines of the slots in which the die bars are located.

Figure 7 shows a modified form of die bar 24 designed for producing fractional inch panel dimensions when desired. In this form of bar the integral key 20b is offset laterally from the flanging shoulder 19 the amount desired.

Figure 8 shows another modified form of die bar 26 designed for producing fractional inch panel dimensions. Each die bar is provided with a relatively wide slot 27 along the bottom, arranged to receive the top leg of an inverted L-shaped key 28. The depending leg 20c of the key can be interchangeably mounted in the die plate slots, in the same manner as the keys 20, 20a, or 20b of the die bars previously described. The arrangement is such, however, that when the L-shaped key 28 is turned in one direction, as shown in full lines in Figure 8, the flanging shoulder of the die bar is in a predetermined offset relation with the receiving slot of the die plate, but when the key is reversed or turned in the opposite direction as shown in dotted lines Figure 8, the flanging shoulder will be centered with the center line of the die plate slot. Manifestly, L-shaped keys similar to key 28 may also be provided to produce any desired fractional inch departure from the standard spacings of the die plate slots.

The male die bar shown in Figure 13 has its key 23 offset laterally from the flanging shoulder 22, to provide a predetermined fractional inch departure from the standard spacing of the die plate slots, to match correspondingly offset female die bars, when required.

The die bars may be arranged in any suitable manner to form the corners of the rectangular die forms of different sizes, as desired. For example, Figures 9, 10 and 11 illustrate one method of completing a corner, as applied to the female die bars 16, wherein separate corner pieces 25 are inserted at the desired points of intersection of a die form. One or more lengths of die bars 16 are then employed as required to complete each of the four sides of the die form. With this method, of course, a stock of die bars of a relatively limited number of different predetermined lengths are provided to produce a multiplicity of die forms.

Figures 12, 13 and 14 illustrate another method of forming the corners of the die forms, as applied to the male die bars. In this case, the die bars 17 may be of more or less intermediate length, and are joined at intersecting corners of each die form by abutting one end of a die bar against the side of the next die bar, as illustrated diagrammatically in Figure 14. For such an arrangement, the ends of each die bar 17 may be formed as shown in Figures 12 and 13, wherein the forming rib 22 is extended at 22a beyond the squared end 17a of the body of said bar, so that the extension 22a will project substantially to the forming rib 22 of the bar which it abuts, and thus provide a substantially closed, continuous forming rib at each corner of the die form.

The male die bars 17, 17 can also be used in conjunction with separate corner pieces in a manner similar to the female corner piece 25.

It will also be observed that the female corner piece 25 shown in Figure 10 can be provided with cut-away portions 25a, 25a in alignment with the two right-angled forming grooves thereof, the purpose of such cut-away portions being to accommodate the forming ribs 22 of the male die bars 17, when the latter are arranged in endwise abutting relation to each other, as indicated in Figure 14.

Referring now more particularly to the manner in which the die bars may be selectively arranged on the die plates 13 and 14 to form one or more rectangular die forms of an infinite number of sizes and shapes, varying by inches or fractions thereof, it should be explained that the specific spacing or "layout" of the intersecting slots shown in Figure 3 is the result of an intensive search for an arrangement of slots which makes it possible, with a minimum number of slots arranged not less than 2 inches from each other, to flange in a single operation either four identical panels with their dimensions ranging from 2" x 2" to 22" x 22", or two panels ranging from 2" x 2" to 22" x 48"; or one panel ranging from 2" x 2" to 48" x 48".

With the heavy pressures involved and the relatively great expanse of the die slot plates, it is very important to "center the load" as much as possible. For this reason I confine myself practically to the 2" and 3" spacing as larger spacing causes various size sheets to be placed badly off center—an action that will gradually strain the heavy but large area ram. Nevertheless, where it does not cause serious off-centering of the load, it is permissible to change two 2" spacings into one 4" or two 3" into one 6", in order to reduce the total numbers of slots—a most desirable end.

In endeavoring to apply these principles to a slot "layout" that would permit forming at one operation either one sheet or two medium size sheets or four or more small sheets, I discovered two things: First, that unlike my device shown in Patent 2,276,052, all slots, including those on either side of the center lines, must be full—not fractional—inches apart if any of them are; and second, that the keys must be set in the die bars so that when set in the selected slots in any portion of the die slot plate, the dies will produce the desired sheet measurements.

That being done, and a symmetrical layout of 2" and 3" slots being made on both sides of the center line of the plate (to give multiple production), I encountered another difficulty that at first appeared insurmountable.

It was that while I could produce two or four (or more) small sheets at one operation, the moment I tried to produce the larger single sheets, I could produce all the even inch sizes but very few of the odd inch sizes. This was due to the simple fact that twice any figure, whether even or odd, is always even. This is not helped by introducing an odd inch spacing between the two groups, as then the result of the total addition is always odd.

I then found that to maintain reasonable centering of the load for multiple production, odd and even groups of spacings (2" and 3" or equivalent) should be arranged in alternating interspersed groups across the plate; that the odd and even groups on each half of the plate should be disposed, respectively, toward opposite sides of said half, but that the spacings of the slots on opposite sides of the center line must not be symmetrical to each other. Thus, it will be observed that the two sets of slots are disposed in such systematic irregular order that no quarter of the plate has a layout similar to any other quarter.

The die slot plate layout shown in Figure 15 is the best example of this principle. (The one 4" spacing is permissible as it does not throw any size seriously off-center, as shown in the schedule diagram.)

In very long die slot plates, while it is possible to alternate additional groups of 2" and 3" spacings (with an increasing number of permissible 4" and 6" spacings), I have found that a better load centering is produced throughout the entire range by rather correspondingly increasing the number of 2" spacings and 3" spacings in their own groups. In this preferred arrangement as applied to long plates, the total number of slots can be held down by increasing the proportion of 3" to 2" spacings and the permissible 4" and 6" exceptions, but being careful to maintain approximately the degree of dissymmetry on either side of the plate center line shown in Figure 15.

In this preferred slot layout there are but two groups of 2", and two groups of 3" spacings (disregarding the permissible 4" and 6" slot saving spaces). This has proven to be far the least confusing type of layout for the operator in reading his slot numbers quickly.

The "die slot schedule" shown in Figure 15 is designed for reference by the operator in setting up the die assembly for various selected panel sizes.

It should also be explained in referring to the "die slot schedule" of Figure 15, that in cases where the flanged panels are to be used in holding frames, the panel sizes are commonly measured from between the center lines of the holding frames, rather than from the edges of the panels themselves. Thus in said "die slot schedule," each panel dimension shown arbitrarily includes 1" added to the actual length or width of the panel body, so as to allow for ½" for the frame width at each edge of the panel.

The die slot schedule in Figure 15 is divided into two parts, the upper part marked "Multiple"

showing the preferred selections of slots when four similar panels are to be flanged simultaneously, one in each corner area of the die plate. The lower portion of the schedule, marked "Single" shows the preferred selection of slots when one panel is to be made.

It will be observed that the die bar slots are set at a minimum distance of 2 inches, from center to center, yet successive 1″ increases in sheet dimensions can readily be obtained, because there are always available slots 3″ further in one direction and 2″ shorter in the opposite direction, or 4″ further and 3″ shorter.

By the use of offset die bar keys, of course, the apparatus is capable of providing small or fractional inch variations of panel sizes, while maintaining a relatively wide spacing of the die bar slots desirable for strength of the die plates.

To illustrate the use of the die slot schedule, Figure 15, Figure 3 shows in dot and dash lines the preferred selection of slots indicated on said schedule for flanging four like panels, each measuring 15″ x 17″. These selections are found on the multiple schedule, Figure 15, wherein the preferred spacings for 15″ are indicated for each side of the die plate, between slots A and G, and N and S, respectively. The preferred length of 17″ indicated for the upper and lower parts of the die plate, are between slots S and M, and I and C. By fixing die bars in the slots thus indicated, four die forms of the desired size and shape are formed, as shown.

The arrangement just described is such that the four die forms are disposed in substantially balanced relation to the longitudinal and transverse axes, so as to avoid any tendency to tilt the die plates due to uneven distribution of the work therebetween. It will be observed further that all permissible dimensions indicated on the multiple schedule have been carefully selected so as to produce a symmetrical placing of the die forms on the four corner areas of the die plate, which arrangement, although not exactly counterbalanced in several instances, yet gives a sufficiently balanced disposition of the multiple die forms for all practical purposes.

The schedule for single sheet dimensions at the lower part of Figure 15 is especially designed for use in flanging single panels, which are too large to be made in quadruplicate. It will be noted here also, that the preferred dimensions settings indicated are arranged substantially symmetrically of the die plate, with the exception of only two dimensions, namely, 19″ and 21″. It will be understood, however, that most panels having their maximum dimensions less than 22″ will usually be flanged in multiple, so this shortcoming is of no practical importance. And in any event, if necessary, a sheet of material of similar thickness can be disposed between die bars in counterbalancing relation to such single offset panels, as indicated by the two dotted lines designated 17 and 19 on the single die slot schedule.

It will also be understood that there are several alternative combinations of slots which can be employed to make relatively small sheets of the same size and shape, so that the die plates are not necessarily limited to the forming of four panels at once. In other words, the slots are so arranged that die forms of many different sizes and shapes can be formed universally at numerous different locations on the surface of the die plate, as desired.

For any intermediate or fractional inch variation from the full inch dimensions indicated on the "die slot schedule," Figure 15, die bars with offset keys such as shown in Figures 7, 8 or 13, may be employed as required. Die bars having removable keys such as shown in Figures 7 and 8 may be employed with different keys giving any desired variation in fractional inch offsets. In the large production of given fractional sized sheets, however, it may often be quicker and more economical to make die bars with integrally-formed keys for the size desired.

It is to be understood that this invention is not to be limited by the exact embodiments of the device shown, which are merely by way of illustration and not limitation, as various and other forms of the device will, of course, be apparent to those skilled in the art without departing from the spirit of the invention or the scope of the claims.

I claim:

1. In a die assembly for a flange drawing press, a flat plate having two sets of parallel slots therein intersecting at right angles to each other, each set being disposed with their center lines spaced apart at irregularly varying interspersed distances which are odd and even multiples of a predetermined increment of measurement with a minimum of twice said increment, the two sets of slots being disposed in identical order of spacing, said slots being arranged to form a plurality of complete rectangular marginal die receiving shapes having dimensions varying by said standard increment of measurement in each direction, for selectively interchangeable reception of a plurality of flange-forming die bars.

2. In a die assembly for a flange drawing press, a flat plate having two sets of parallel slots therein arranged at right angles to each other, each set being disposed with their center lines spaced apart at irregularly varying interspersed distances which are odd and even multiples of a predetermined increment of measurement with a minimum of twice said increment, the two sets of slots being disposed in identical order of spacing, and each set of slots being arranged in dissimilar spacing at opposite sides of the center line of the plate to form a plurality of complete rectangular die receiving shapes of the same dimensions for selectively interchangeable reception of a plurality of flange-forming die bars on opposite sides of said last-named center line.

3. In a die assembly for a flange drawing press, a flat bed plate having two sets of parallel slots therein arranged at right angles to each other, each set being disposed with their center lines spaced apart at irregularly varying interspersed distances which are odd and even multiples of a predetermined increment of measurement with a minimum of twice said increment, the two sets of slots being disposed in identical order of spacing, and a plurality of flange forming die bars each having means for interchangeable engagement in said slots, said slots being so arranged that said die bars may be selectively interchangeable universally over said bed plate to form simultaneously a plurality of similar complete rectangular die forms in different areas of said bed, each varying by the said predetermined increment of measurement.

4. In a die assembly for a flange drawing press, a flat plate having two sets of parallel slots therein arranged at right angles to each other, each set being disposed with their center lines spaced apart at irregularly varying interspersed distances which are multiples of a predetermined increment of measurement with a minimum of twice said increment, the two sets of slots being disposed in identical order of spacing, and a plurality of die bars, each having a longitudinal key for interchangeable engagement in said slots and a flange-drawing shoulder along its upper face in centered relation with its respective key, said slots being so arranged that said die bars may be selectively interchangeable in either set of slots to form complete rectangular marginal dies of different dimensions, varying by said predetermined increment of measurement.

5. In a die assembly for a flange drawing press, a flat plate having two sets of parallel slots therein arranged at right angles to each other, each set being disposed with their center lines spaced apart at irregularly varying interspersed distances which are multiples of a predetermined increment of measurement with a minimum of twice said increment, the two sets of slots being disposed in identical order of spacing, and a plurality of sets of die bars, each die bar having a longitudinal key for interchangeable engagement in said slots and a flange-drawing shoulder along its upper face in centered relation with its respective key, said slots being so arranged that said sets of die bars may be selectively interchangeable in either set of slots to form a plurality of similar complete rectangular marginal dies of varying dimensions in different areas of said plate and disposed substantially symmetrically of the intersecting center lines of said plate.

6. In a die assembly for a flange-drawing press, a flat die plate having two sets of parallel slots therein with their center lines intersecting at right angles, both sets being disposed with their center lines spaced apart at the same irregularly varying interspersed distances which are either odd or even multiples of one inch with a minimum of two inches, and the groups of slots on opposite sides of each center line of said plate being arranged unsymmetrically to each other.

7. In a flange forming apparatus, a pair of rectangular die plates each having two sets of parallel die bar slots intersecting each other on the face of said plate, the center lines of each set of slots being spaced apart at irregularly varying interspersed distances which are either odd or even multiples of a predetermined increment of measurement with a minimum of twice said increment, and the two sets af intersecting slots of each plate being disposed in identical order of spacing so that the slots on one of said plates will register with corresponding slots of the other plate when said plates are presented in opposed mutual relation to each other.

8. In a flange forming apparatus, a pair of rectangular die plates each having two sets of parallel die bar slots intersecting each other on the face of said plate, the center lines of each set of slots being spaced apart at irregularly varying interspersed distances which are either odd or even multiples of a predetermined increment of measurement with a minimum of twice said increment, and the two sets of intersecting slots of each plate being disposed in identical order of spacing so that the slots on one of said plates will register with corresponding slots of the other plate when said plates are presented in opposed mutual relation to each other, and each parallel set of die slots being disposed unsymmetrically on opposite sides of the center line of the plate.

9. In a flange forming apparatus, and in combination with a pair of similar die plates each having sets of intersecting die slots disposed with their centers spaced apart at odd and even multiples of a predetermined increment of measurement with a minimum of twice said increment, a plurality of male and female die bars interchangeably fitting in the die slots of said plates, each of said die bars having a receiving groove along its lower face and detachable keys adapted to be fitted in said grooves and each of said keys having a depending, laterally offset tongue arranged to position its respective die bar selectively in either one of two alternative positions relative to the die slot in which the die bar may be fitted.

10. A die plate for a flanging press, having two similar sets of die slots therein intersecting each other at right angles and adapted for selectively interchangeable reception of flange-forming die bars, the slots of each of said sets of die slots having their center lines spaced apart at odd and even multiples of a predetermined increment of measurement with a minimum of twice said increment, the respective odd-and-even spaced slots being arranged in alternate groups transversely of said plate, with odd and even groups on each half of said plate being disposed respectively toward opposite sides of said half.

11. A die plate for a flanging press, having two sets of die slots therein intersecting each other at right angles and adapted for selectively interchangeable reception of flange-forming die bars, the slots of each of said sets of die slots having their center lines spaced apart at odd and even multiples of a predetermined increment of measurement with a minimum of twice said increment, the two sets of slots being disposed in identical order of spacing, the respective odd-and-even spaced slots being arranged in alternate groups transversely of said plate, with odd and even groups on each half of said plate being disposed respectively toward opposite sides of said half but with the slots on opposite sides of the center line disposed in non-symmetrical relation to each other.

12. In a die assembly for a flange drawing press, a flat plate having two sets of parallel slots therein extending at right angles to each other for detachably receiving die bars in varying selective positions to form rectangular flanging dies of varying dimensions, the slots of each set being arranged with their center lines spaced apart at the same irregularly varying distances which are odd and even multiples of a predetermined increment of measurement with a minimum of twice said increment, and the two sets of slots forming dissimilar patterns on each quarter of the plate, whereby predetermined slots can be selected to form a plurality of complete rectangular slot shapes, the dimensions of which may be varied in both directions by each successive increment of measurement.

13. A die plate for a flanging press, having two similar sets of die slots therein intersecting each other at right angles and adapted for selectively interchangeable reception of flange-forming die bars, the slots of each of said sets of die slots having their center lines spaced apart at odd and even mutliples of a predetermined increment of measurement with a minimum of twice said increment, the respective odd and even spaced slots of each set being arranged in similarly disposed alternate groups transversely of said plate, with odd and even groups on each half of said plate being disposed respectively toward opposite sides of said half, and the two sets of slots forming dissimilar patterns on each quarter of the plate.

14. A die plate for a flanging press, having two sets of die slots therein intersecting each other at right angles and adapted for selectively interchangeable reception of flange-forming die bars, the slots of each of said sets of die slots having their center lines spaced apart at odd and even multiples of a predetermined increment of measurement with a minimum of twice said increment, the two sets of die slots being disposed in identical order of spacing, the respective odd and even spaced slots being arranged in alternate groups transversely of said plate, with odd and even groups of each set being disposed respectively toward opposite sides of each half of said plate, and the two sets of slots forming dissimilar patterns on each quarter of the plate.

15. In a die assembly for a flange drawing press, a flat plate having two sets of parallel slots therein arranged at right angles to each other, each set being disposed with their center lines spaced apart at irregularly varying interspersed distances which are odd and even multiples of one inch, with a minimum of two inches, the two sets of slots being disposed in identical order of spacing, and each set of slots being arranged in dissimilar spacing at opposite sides of the center line of the plate to form a plurality of complete rectangular die receiving shapes of the same dimensions for selectively interchangeable reception of a plurality of flange-forming die bars on opposite sides of said last named center line.

16. In a die assembly for a flange drawing press, a flat plate having two sets of parallel slots therein extending at right angles to each other for detachably receiving die bars in varying selective positions to form rectangular flanging dies of varying dimensions, the slots of each set being arranged with their center lines spaced apart at the same varying irregular distances which are odd and even multiples of one inch, with a minimum of two inches, but arranged so that predetermined slots can be selected to form complete rectangular slot shapes, the dimensions of which may be varied in both directions by each successive increment of one inch.

17. A die plate for a flanging press, having two similar sets of die slots therein intersecting each other at right angles and adapted for selectively interchangeable reception of flange-forming die bars, the slots of each of said sets of die slots having their center lines spaced apart at odd and even multiples of one inch, with a minimum of two inches, the respective odd and even spaced slots being arranged in alternate groups transversely of said plate, with odd and even groups on each half of said plate being disposed respectively toward opposite sides of said half.

18. A die plate for a flanging press, having two sets of die slots therein intersecting each other at right angles and adapted for selectively interchangeable reception of flange-forming die bars, the slots of each of said sets of die slots having their center lines spaced apart at odd and even multiples of one inch with a minimum of two inches, the two sets of die slots being disposed in identical order of spacing, the respective odd and even spaced slots being arranged in alternate groups transversely of said plate, with odd and even groups on each half of said plate being disposed respectively toward opposite sides of said half, but with the slots on opposite sides of the center line of the plate disposed in non-symmetrical relation to each other.

HARVEY B. LINDSAY.

REFERENCES CITED

The following references are of record in the file of this patent:

UNITED STATES PATENTS

| Number | Name | Date |
|---|---|---|
| 2,276,052 | Lindsay | Mar. 10, 1942 |
| 1,189,073 | Driver | June 27, 1916 |